United States Patent
Dawson et al.

(10) Patent No.: US 10,338,899 B2
(45) Date of Patent: Jul. 2, 2019

(54) DYNAMICALLY COMPILED ARTIFACT SHARING ON PAAS CLOUDS

(71) Applicants: International Business Machines Corporation, Armonk, NY (US); Kenneth B. Kent, Fredericton, New Brunswick (CA); Panagiotis Patros, Fredericton, New Brunswick (CA)

(72) Inventors: Michael H. Dawson, Ottawa (CA); Dayal D. Dilli, Fredericton (CA); Kenneth B. Kent, Fredericton (CA); Panagiotis Patros, Fredericton (CA); Peter D. Shipton, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 95 days.

(21) Appl. No.: 15/332,689

(22) Filed: Oct. 24, 2016

(65) Prior Publication Data

US 2018/0113684 A1 Apr. 26, 2018

(51) Int. Cl.
*G06F 8/36* (2018.01)
*H04L 29/08* (2006.01)

(52) U.S. Cl.
CPC .............. *G06F 8/36* (2013.01); *H04L 67/10* (2013.01); *H04L 67/34* (2013.01)

(58) Field of Classification Search
CPC ............ G06F 8/36; H04L 67/34; H04L 67/10
See application file for complete search history.

(56) References Cited

U.S. PATENT DOCUMENTS

| | | | |
|---|---|---|---|
| 7,216,088 B1* | 5/2007 | Chappel | G06Q 10/063118 705/7.17 |
| 8,789,048 B2 | 7/2014 | Bozek et al. | |
| 8,978,035 B2 | 3/2015 | McGrath et al. | |
| 9,134,980 B1* | 9/2015 | Cabrera | G06F 8/48 |

(Continued)

FOREIGN PATENT DOCUMENTS

WO 2015/126292 A1 8/2015

OTHER PUBLICATIONS

Ogata, KI., Onodera, T., "Increasing the Transparent Page Sharing in Java," IEEE, 2013, pp. 34-44.

(Continued)

*Primary Examiner* — Ziaul A Chowdhury
(74) *Attorney, Agent, or Firm* — Patterson + Sheridan, LLP

(57) ABSTRACT

Embodiments disclose systems, methods and computer program products to perform an operation for sharing artifacts between instances of an application deployed in a cloud computing environment. The operation generally includes upon determining, during staging of the application, that a set of artifacts are not available for instances of the application to share in the cloud computing environment, generating the set of artifacts via a first application instance, storing the set of artifacts, and requesting a re-staging of the application. The operation also includes during the re-staging of the application, generating a file for deploying scaled instances of the application and packing the stored set of artifacts into the generated file via a second application instance. The operation further includes executing an instance scale out of the application with the generated file comprising the stored set of artifacts.

11 Claims, 6 Drawing Sheets

(56) References Cited

U.S. PATENT DOCUMENTS

| | | | | |
|---|---|---|---|---|
| 9,235,386 | B2* | 1/2016 | Carlson | G06F 8/36 |
| 2007/0169103 | A1* | 7/2007 | Bhatkhande | G06F 8/71 |
| | | | | 717/170 |
| 2007/0240102 | A1* | 10/2007 | Bello | G06F 8/36 |
| | | | | 717/104 |
| 2009/0055809 | A1* | 2/2009 | Campbell | G06F 8/36 |
| | | | | 717/140 |
| 2010/0223469 | A1* | 9/2010 | Hussain | G06F 21/64 |
| | | | | 713/175 |
| 2011/0265081 | A1 | 10/2011 | Lucovsky et al. | |
| 2011/0283194 | A1* | 11/2011 | Chen | G06F 8/38 |
| | | | | 715/735 |
| 2012/0096525 | A1* | 4/2012 | Bolgert | G06F 11/3006 |
| | | | | 726/6 |
| 2012/0102486 | A1* | 4/2012 | Yendluri | G06F 8/60 |
| | | | | 717/177 |
| 2013/0031542 | A1* | 1/2013 | Arcilla | G06F 8/60 |
| | | | | 717/177 |
| 2013/0346945 | A1* | 12/2013 | Yousouf | G06F 8/36 |
| | | | | 717/121 |
| 2014/0280484 | A1* | 9/2014 | Klemenz | H04L 67/10 |
| | | | | 709/203 |
| 2014/0359043 | A1 | 12/2014 | Gao et al. | |
| 2014/0373011 | A1* | 12/2014 | Anderson | G06F 9/45533 |
| | | | | 718/1 |
| 2016/0092179 | A1* | 3/2016 | Straub | G06F 8/20 |
| | | | | 717/107 |
| 2016/0094626 | A1* | 3/2016 | Bajaj | H04L 67/10 |
| | | | | 709/203 |
| 2016/0179502 | A1* | 6/2016 | Cawley | G06F 8/54 |
| | | | | 717/121 |
| 2016/0253160 | A1* | 9/2016 | Alger | H04L 67/34 |
| | | | | 717/177 |
| 2016/0359975 | A1* | 12/2016 | Battle | H04L 67/1097 |
| 2016/0371060 | A1* | 12/2016 | Goja | G06F 8/51 |
| 2017/0161043 | A1* | 6/2017 | Khazanchi | H04L 67/10 |
| 2018/0097706 | A1* | 4/2018 | Gupte | H04L 67/10 |

OTHER PUBLICATIONS

Vaquero, L.M., Rodero-Merino, L., Buyya, R., "Dynamically Scaling Applications in the Cloud," ACM SIGCOMM Computer Communication Review, vol. 41, No. 1, Jan. 2011.

Grace Period Disclosure: IBM Centre for Advanced Studies—Atlantic, Improving Availability of PaaS Clouds, UNB FCS Research Expo 2016, Panagiotis (Panos) Patros, Apr. 8, 2016, 18 pages.

Grace Period Disclosure: International Business Machines Corporation, "Managing System Properties," IBM Knowledge Center, downloaded from <https://www-01.ibm.com/support/knowledgecenter/HW4L4/p8efd/p8efd_managing_powervm_props.htm> on Feb. 10, 2016, 3 pages.

* cited by examiner

DYNAMICALLY COMPILED ARTIFACT SHARING ON PAAS CLOUDS

STATEMENT REGARDING PRIOR DISCLOSURES BY THE INVENTOR OR A JOINT INVENTOR

The following disclosures are submitted under 35 U.S.C. 102(b)(1)(A): "Leveraging Java Optimizations to Improve Density in Cloud Environments," International Business Machines, Nov. 2, 2015, "http://www.slideshare.net/michaeldawson3572846/java-one-2015-v1"; and "Improving Availability of PaaS Clouds," International Business Machines, Apr. 8, 2016, UNB FCS Research Expo 2016.

BACKGROUND

The present disclosure generally relates to cloud computing, and more specifically, to techniques for sharing artifacts on cloud computing platforms (e.g., such as a platform as a service (PaaS) cloud infrastructure).

Cloud computing services are increasingly being used by software developers to manage and develop complex applications. Platform as a Service (PaaS), for example, is one type of cloud computing platform that developers can use to deploy, run and manage applications without the complexity of building and maintaining the infrastructure associated with developing and launching applications. For example, PaaS providers can manage the supporting hardware, operating system, runtimes, supporting services, etc. for users' applications.

Once an application (or its artifacts) is uploaded to a PaaS cloud platform, the PaaS cloud platform generally controls the deployment and staging of the application through buildpacks. A buildpack, for example, generally provides a framework including a set of runtimes and middleware that can be used to run the application. When an application is first pushed, the PaaS cloud platform uses the buildpack to identify, compile, and bundle the application's dependencies (or resources), runtimes, etc., into a deployment package (referred to herein as a droplet) along with the application. Once created, the PaaS cloud platform installs the droplet including the application artifacts into an isolated container and starts the application.

PaaS can provide horizontal scalability (e.g., scale out) and/or vertical scalability (e.g., scale-up) services for applications. With horizontal scalability, for example, PaaS supports deployments at scale by allowing instances (e.g., copies) of an application to be added either manually or automatically when the traffic is high for a particular application. For example, for each new instance, the PaaS can create a new isolated container, install the droplet previously created for the application into the new container, and start the new instance.

As cloud computing moves to large hybrid cloud environments, however, performing scaling out in this manner can be inefficient. For example, there are barriers in current scaling out techniques to leveraging information gathered by previous instances of an application. Using the droplet (e.g., deployment package) as a reference example, the PaaS typically creates the droplet before the application has had a chance to run. As a result, when the PaaS creates new instances of an application using such droplet, the PaaS cannot leverage information from previous executions of instances of the application, resulting in the newly created instance paying the full startup and warmup cost.

SUMMARY

One embodiment presented herein describes a method. The method generally includes upon determining, during staging of the application, that a set of artifacts are not available for instances of the application to share in the cloud computing environment, generating the set of artifacts via a first application instance, storing the set of artifacts, and requesting a re-staging of the application. The method also includes during the re-staging of the application, generating a file for deploying scaled instances of the application and packing the stored set of artifacts into the generated file via a second application instance. The method further includes executing an instance scale out of the application with the generated file comprising the stored set of artifacts.

Other embodiments include, without limitation, a computer program product that includes a storage medium having computer-readable program code that enables a processing unit to implement one or more aspects of the disclosed methods as well as a system having a processor, memory, and application programs configured to implement one or more of the disclosed methods.

DETAILED DESCRIPTION

Figure 1:
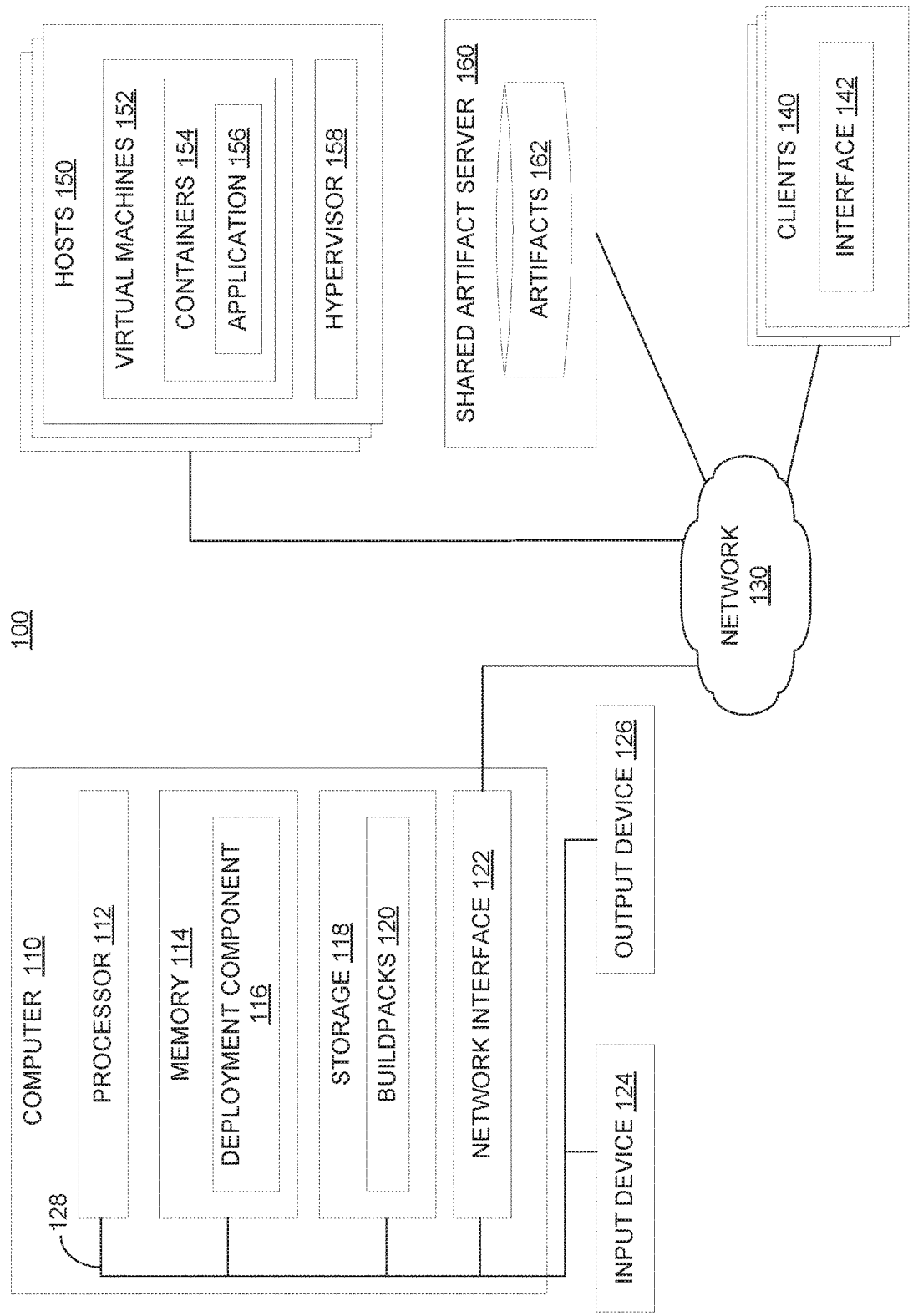
FIG. 1 illustrates a cloud computing environment configured to share dynamically compiled artifacts among instances of an application, according to one embodiment.

Embodiments presented herein provide techniques for reducing the startup and/or warmup time associated with scaling out applications in a cloud computing environment (e.g., a PaaS cloud). More specifically, embodiments provide techniques for sharing dynamically generated artifacts (e.g., such as Java virtual machine (JVM) shared class cache repositories, Just-in-Time compiled (JITed) code, Python bytecode, etc.) across instances supporting the same application in a cloud (e.g., PaaS cloud).

For example, a developer may upload applications (or application artifacts) to a PaaS cloud platform to allow the PaaS cloud platform deploy and manage the infrastructure (e.g., operating system, runtimes, hardware, etc.) associated with hosting the application for users. Once uploaded, the PaaS cloud platform creates a zeroth instance of the application, and uses the zeroth instance to generate dynamically compiled artifacts (e.g., such as shared class cache) for the application. That is, the PaaS cloud platform can use the instructions in the buildpack to compile the application during the compile phase (e.g., during the staging process), and once compiled, execute the application for a predetermined period of time during the run phase in order to generate the dynamically compiled artifacts. Using a Java application as a reference example of an application that may be uploaded to a PaaS cloud platform, for the zeroth time, the PaaS cloud platform, during the compile phase, may compile artifacts (e.g., JavaServer pages (JSP) files) of the Java application, and, during the run phase, may execute the Java application for a period of time in order to generate JVM shared class cache files.

Once generated, the PaaS cloud platform may upload the dynamically compiled artifacts (e.g., shared class cache, pre-compiled JSPs, etc.) generated by the zeroth instance to a shared artifact server, which the PaaS cloud platform may use to store dynamically compiled artifacts for other instances. Once stored, the PaaS cloud platform may re-stage the application to pack the dynamically compiled artifacts stored in the shared artifact server into the deployment package (e.g., droplet) for the application. In this manner, when the PaaS cloud platform creates subsequent scaled instances of the application, the subsequent scaled instances can automatically use the dynamically compiled artifacts (e.g., shared class cache, pre-compiled JSPs, etc.) generated by the zeroth instance, which in turn, can reduce the amount of time associated with starting up subsequent instances of an application deployed by the PaaS cloud platform.

Note many of the following embodiments use JVM shared class cache, pre-compiled JSPs, etc., as reference examples of dynamically compiled artifacts that may be shared across instances of an application (e.g., a Java application) deployed by a PaaS cloud platform. Of course, those of ordinary skill in the art will recognize that the techniques presented herein can be adapted for use for other types of dynamically generated sharable artifacts and/or other types of applications.

FIG. 1 illustrates an example of a cloud computing environment 100 configured to dynamically share artifacts across instances of an application, according to one embodiment. In one embodiment, the cloud computing environment 100 is a PaaS cloud computing platform that is configured to deploy, run and manage applications pushed to the cloud computing environment for one or more users. The cloud computing environment 100 includes a computer 110. In one embodiment, the cloud computing environment 100 includes computer 110, one or more hosts 150, and shared artifact server 160 connected via network 130. In general, the network 130 may be a telecommunications network and/or a wide area network (WAN). In a particular embodiment, the network 130 is the Internet.

The computer 110 generally includes a processor 112 which obtains instructions and data via a bus 128 from a memory 114 and/or a storage 118. The computer 110 may also include one or more network interface devices 122, input devices 124, and output devices 126 connected to the bus 128. The computer 110 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 112 is a programmable logic device that performs instruction, logic, and mathematical processing, and may be representative of one or more CPUs. The network interface device 122 may be any type of network communications device allowing the computer 110 to communicate with other computers and/or devices via the network 130.

The storage 118 is representative of hard-disk drives, solid state drives, flash memory devices, optical media and the like. Generally, the storage 118 stores application programs and data for use by the computer 110. In addition, the memory 114 and the storage 118 may be considered to include memory physically located elsewhere, for example, on another computer coupled to the computer 110 via the bus 220.

The input device 124 may be any device for providing input to the computer 110. For example, a keyboard and/or a mouse may be used. The input device 124 represents a wide variety of input devices, including keyboards, mice, controllers, and so on. Furthermore, the input device 124 may include a set of buttons, switches or other physical device mechanisms for controlling the computer 110. The output device 126 may include output devices such as monitors, touch screen displays, and so on.

As shown, the memory 114 includes a deployment component 116. The deployment component 116 is generally configured to deploy applications to one or more hosts 150 in the cloud computing environment 100. For example, when a user (e.g., developer) pushes (or uploads) an application 156 to the deployment component 116 via the interface 142 (e.g., graphical user interface (GUI), command line interface (CLI), etc.) executing on client machine 140, the deployment component 116 may determine the type of application 156 (e.g., such as a Java application, node.js application, etc.), analyze application metadata specifying deployment settings (e.g., such as number of instances, memory limits, etc.), and determine the application's dependencies (e.g., such as the required runtime or framework) needed to set up the runtime environment for instances of the application in the cloud computing environment 100.

Storage 118 includes buildpacks 120. Buildpacks 120 are generally a set of startup scripts that the deployment component 116 may use to identify the application's dependencies and set up the runtime environment for the application instances. For example, buildpacks 120 may include instructions for staging the application, during which the deployment component 116 gathers the application's related dependencies, and compiles and packages them into a droplet. In some embodiments, the deployment component 116 may select the particular buildpack 120 to use for the staging process based on the type of application 156 and its dependencies. In some cases, for example, there may different buildpacks 120 for different types of applications 156 (e.g., a Java buildpack for a Java application, a node.js buildpack for a node.js application, a PHP buildpack for a PHP application, etc.). In some cases, when a user pushes an application (via the client 140) to the cloud computing environment 100, the user may also upload a user-defined (or custom) buildpack for the application. Although not shown, storage 118 may also include application metadata (e.g., unique application cloud identifier, hashed source code, etc.), deployment data (e.g., operating system, buildpack associated with application, number of instances, etc.), and other data.

Once a droplet is created, the deployment component 116 uses the droplet to deploy each instance to a container 154 located on a host 150, for example, by installing the droplet in the container 154. The hosts 150 are compute nodes configured to execute one or more virtual machines 152. The hosts 150 include a hypervisor 158, which generally creates, manages, and runs virtual machines on compute nodes. For example, the hypervisor 158 may monitor resource use rates by the virtual machines 152 and may interact with deployment component 116 to add, reduce and/or migrate workloads executed by virtual machines 152.

As noted above, embodiments herein reduce the time associated with starting and warming up application instances deployed in the cloud computing environment 100. For example, as shown, the cloud computing environment 100 includes a shared artifact server 160. As described below, the shared artifact server 160 is generally configured to store dynamically compiled artifacts 162 (e.g., shared class cache, pre-compiled JSPs, etc.) for each application pushed (via a client 140) to the cloud computing environment 100. In some embodiments, the shared artifact server 160 may store the artifacts 162 based on one or more of the application's unique cloud identifier name, hashed value (e.g., calculated based on hashing the application's source code), etc. In one embodiment, the hashed value can be based solely on the application code. In another embodiment, the hashed value can be based on the application code in addition to the underlying runtime and framework in the cloud (e.g., such as Java Runtime Environment (JRE)) or application server code.

The shared artifact server 160 may determine the particular hashing method to use based on how often if receives a request for the application. For example, if the amount of requests is relatively large and/or frequent, the shared artifact server 160 can store the artifacts for the application based solely on the application code. On the other hand, if the amount of requests is relatively small and/or infrequent, the shared artifact server 160 can store the artifacts for the application based on the application code and underlying runtime/framework. Doing so allows the deployment component 116 to check for any changes to the application (e.g., due to updates) during subsequent pushes of the application to the cloud computing environment 100. Once stored, the shared artifact server 160 can receive a request for an application's sharable artifacts, 162, process the request, and return the artifacts 162, if available. In one embodiment, the deployment component 116 can communicate with the shared artifact server 160 via hypertext transfer protocol (HTTP).

In addition, embodiments herein provide techniques for modifying the process to set up the runtime environment for new instances (e.g., in order to reduce the startup time for new instances). As described below with reference to FIG. 2, in one embodiment, while the deployment component 116 executes the buildpack (e.g., during the compile phase) for an application, the deployment component 116 may query the artifact server 160 to determine if there are artifacts available for the application. If the deployment component 116 determines there are no artifacts available for the application (e.g., the application may be pushed to the cloud for the first time, the application has been updated, etc.), the deployment component 116 can create a short-lived application instance (e.g., zeroth instance) to generate the dynamically compiled artifacts 162 and upload the artifacts to the shared artifact server 160. In addition, when uploading the artifacts 162, the deployment component 116 can upload a hashed value of the application's source code. Once uploaded, the deployment component 116 can re-stage the application to pack the artifacts 162 (uploaded to the shared artifact server 160) into a droplet generated from the staging process. The deployment component 116 can then deploy the droplet (which include the artifacts 162) in each subsequent instance that it creates in the cloud computing environment 100 (e.g., to share the traffic load). Doing so allows the subsequent instances to automatically leverage the shared artifacts generated by the zeroth instance (e.g., without having to repeat the process of generating artifacts for each subsequent instances). In this manner, techniques herein can substantially reduce the time associated with starting up instances created during a horizontal scale out.

Figure 2:
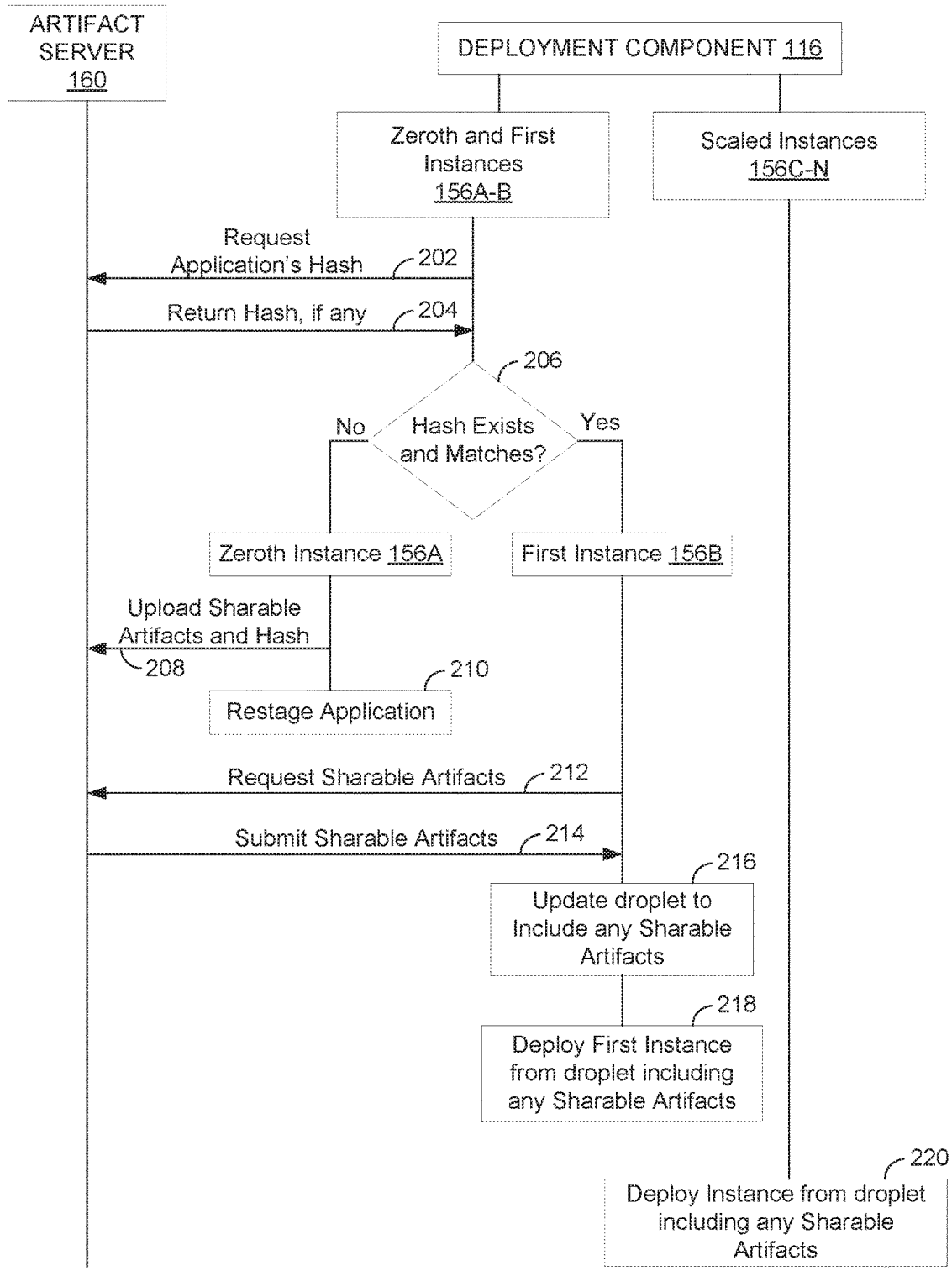
FIG. 2 illustrates an example flow of components of the cloud computing environment interacting to share dynamically compiled artifacts between instances of an application, according to one embodiment.

FIG. 2 illustrates an example flow of components of the cloud computing environment (e.g., artifact server 160 and deployment component 116) interacting to share dynamically compiled artifacts between instances of an application, according to one embodiment.

In this example, the deployment component 116 can create a zeroth instance 156A of the application in situations where the deployment component 116 determines artifacts are not available for sharing between instances of the application. As noted above, the deployment component 116 may do so when the application is pushed for the first time or there has been an update to the application. For example, at 202, the deployment component 116 may request the application's hash from the artifact server 160. At 204, the artifact server 160 may return the hash, if available. At 206, the deployment component 116 uses the hash to determine if the application has been updated (e.g., by computing a hash and determining if the retrieved hash value matches the computed hash).

If the deployment component 116 determines there are no artifacts available, the deployment component 116 creates, during the execution of the buildpack, a zeroth instance of the application and uses the zeroth instance to generate the dynamically compiled artifacts. For example, the deployment component 116 allows the zeroth instance of the application to run for a period of time in order to generate the dynamically compiled artifacts. As noted above, such artifacts may include, e.g., for a Java application, shared class cache, precompiled JSPs, etc.

Once generated, the deployment component 116 uses the zeroth instance 156A to upload the compiled artifacts 162 to the artifact server 160 (along with a hash of the application's source code). Once uploaded, the deployment component 116 re-stages the application, during which it re-executes the buildpack and creates a subsequent instance (e.g., first instance) of the application. While executing the buildpack, the deployment component 116 can use the first instance 156B to interact with the artifact server 160 (e.g., steps 202-206) to determine if artifacts 162 are available for the application. If so, the deployment component 116 requests (via the first instance) the sharable artifacts from the artifact server 160 (212). In response to the request, the artifact server 160 returns the artifacts to the first instance. Once the artifacts 162 are retrieved, the deployment component 116 generates a droplet (e.g., as part of the staging process) and updates the droplet to include the artifacts 162. Once the staging process is complete, the deployment component 116 deploys the first instance from the droplet (containing the previously generated artifacts), which the first instance can automatically use.

The deployment component 116 can then initiate an instance scale out by locating the droplet generated for the application during the staging process and installing the droplet in an isolated container for each instance 156C-N. Because the droplet, which is used to deploy each new instance, already has the previously generated artifacts packed inside, each scaled instance can readily use the artifacts (e.g., shared cache) improving the startup time for each scaled instance.

Figure 3:
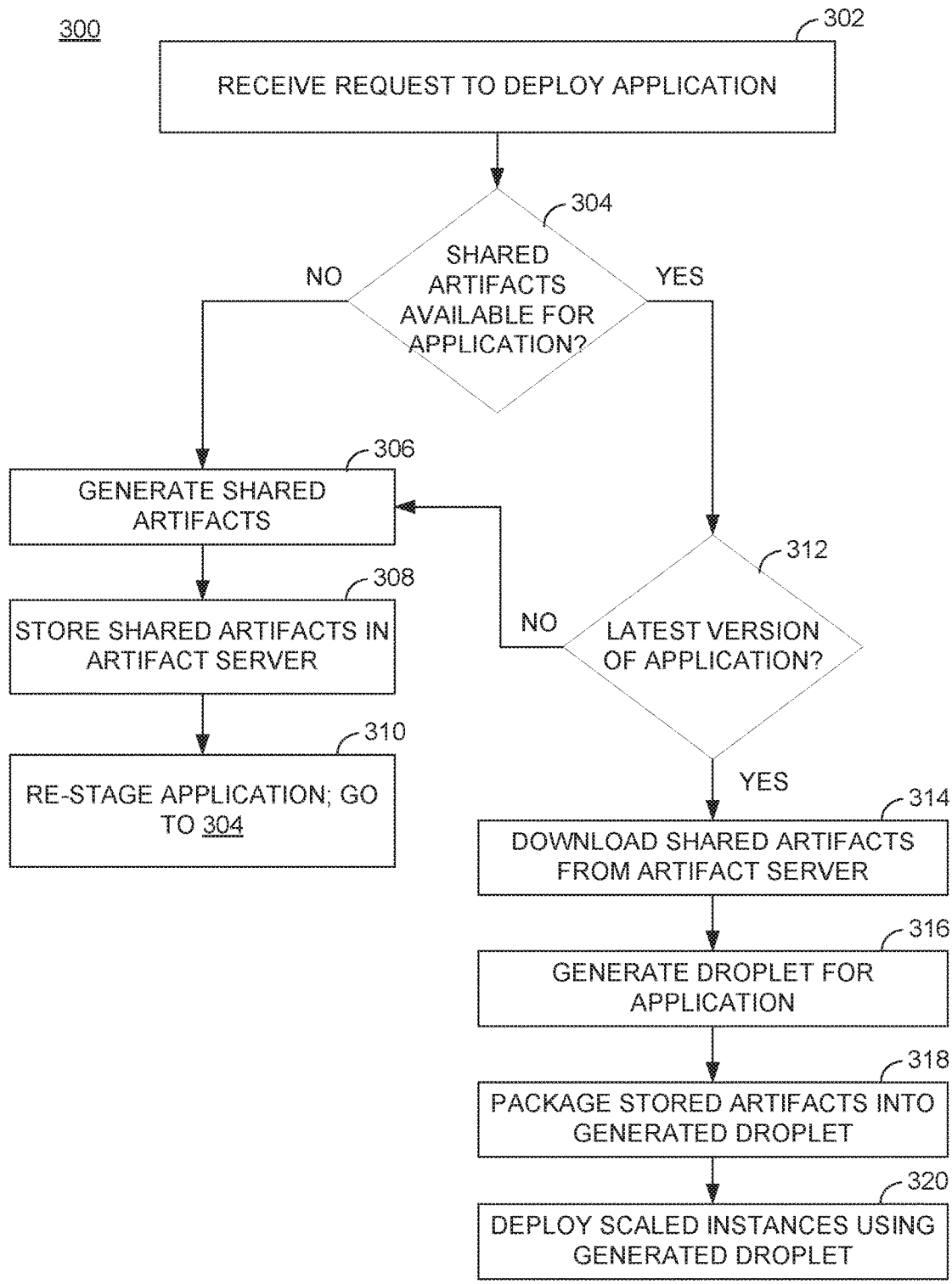
FIG. 3 is a flow chart illustrating a method to share dynamically compiled artifacts among instances of an application, according to one embodiment.

FIG. 3 illustrates a method 300 for sharing dynamically compiled artifacts between instances of an application, according to one embodiment. As shown, the method 300 begins at block 302 where the deployment component 116 receives a request to deploy an application. At block 304, the deployment component 116 determines if there are shared artifacts available for the application. For example, as noted above, the deployment component 116 can interact with the artifact server 160 to determine if artifacts for the application are stored in the artifact server 160. In some cases, e.g., if the application is pushed to the cloud computing environment 100 for the first time, the deployment component 116 may determine that artifacts for the application are not available. If the artifacts are not available, the deployment component 116 generates the shared artifacts (block 306) and stores the shared artifacts in the artifact server 160 (block 308). For example, as noted above, in one embodiment the deployment component 116 can generate a short-lived instance (e.g., zeroth instance) to generate and store the shared artifacts in the artifact server 160.

On the other hand, if at block 304, the deployment component 116 determines that shared artifacts are available, the deployment component 116 can verify that the shared artifacts belong to the current version of the application. For example, as noted above, in cases where artifacts for the application are stored in the shared artifact server 160, the artifacts may be stored along with a hashed value of the application. The deployment component 116, at block 312, can use the hashed value to determine if the application has been updated. If so, the deployment component 116 can generate and store another set of shared artifacts for the updated version of the application (blocks 306-308). Once stored, the deployment component 116 re-stages the application (block 310) and goes to block 304.

During the re-staging procedure, after the deployment component 116 verifies (at block 312) that the application has not been updated, the deployment component 116 downloads the shared artifacts from the artifact server 160 (block 314), and generates a droplet for the application (block 316). At block 318, the deployment component 116 packages the stored artifacts into the generated droplet. At block 320, the deployment component 116 executes an instance scale out of the application using the generated droplet. For example, as noted above, since the generated droplet includes the previously generated shared artifacts, each instance that is deployed by the deployment component 116 can automatically use the artifacts and reduce the time associated with starting up and running in a container (e.g., to shared the traffic load for the application).

Advantageously, embodiments disclosed herein enable dynamically shared artifacts of an application to be shared between multiple instances of the application deployed to a cloud computing environment. The techniques herein an be used to shared dynamically compiled artifacts across scaled instances even if they do not run on the same VM (e.g., VM 152) or hypervisor (e.g., hypervisor 158). Doing so can improve the performance of deploying instances during a scale out of an application in a cloud computing environment.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
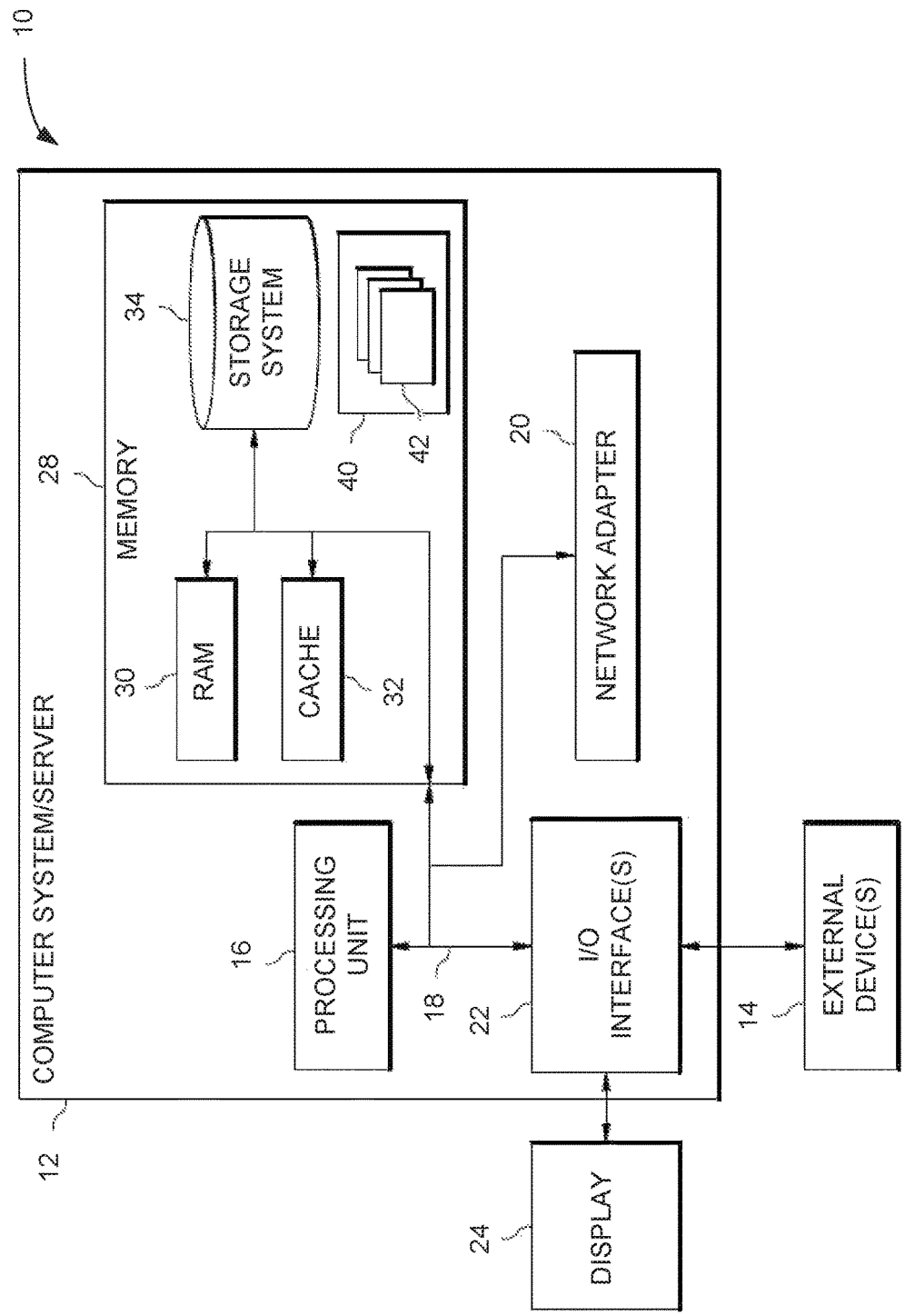
FIG. 4 illustrates a cloud computing node, according to one embodiment.

Referring now to FIG. 4, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
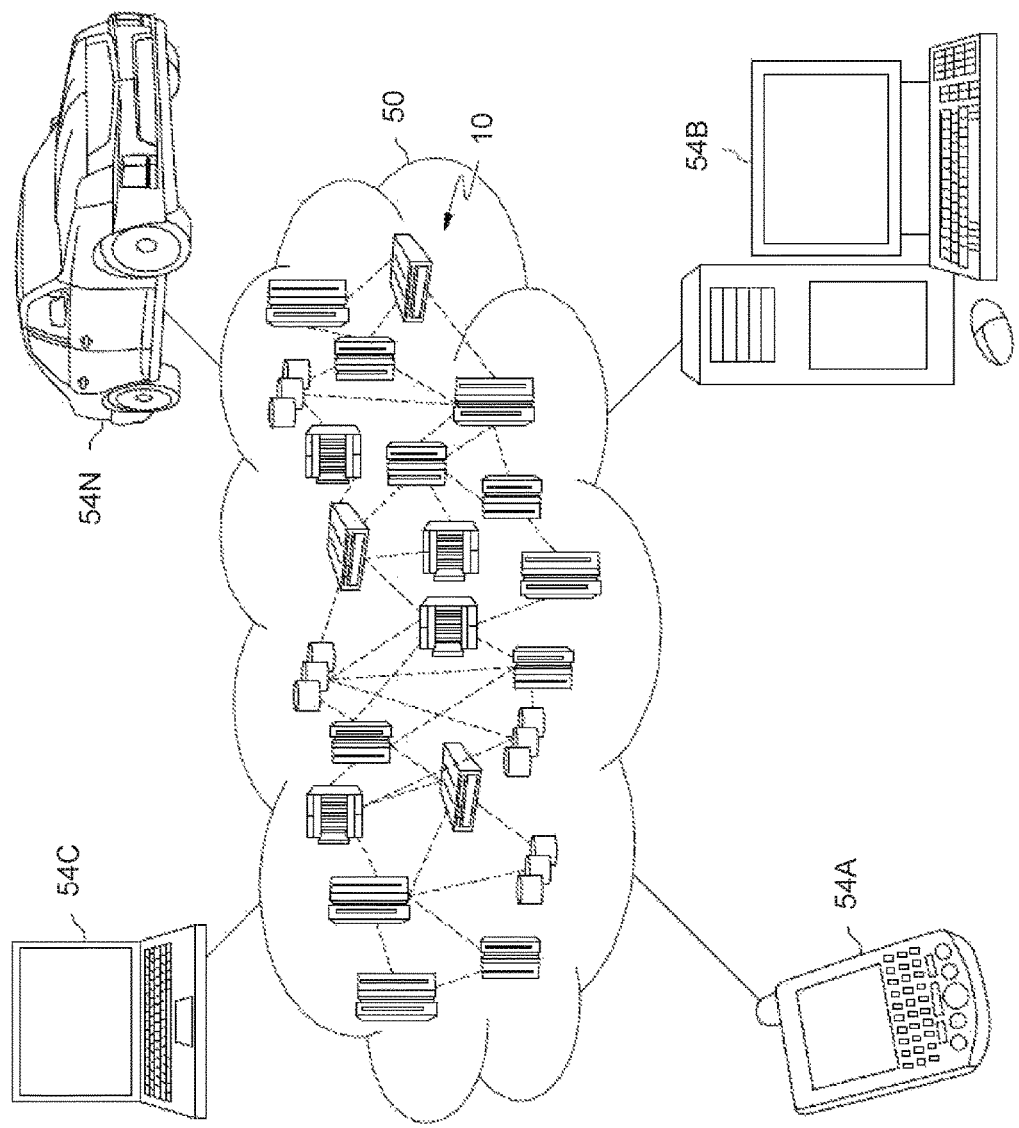
FIG. 5 illustrates a cloud computing environment, according to one embodiment.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
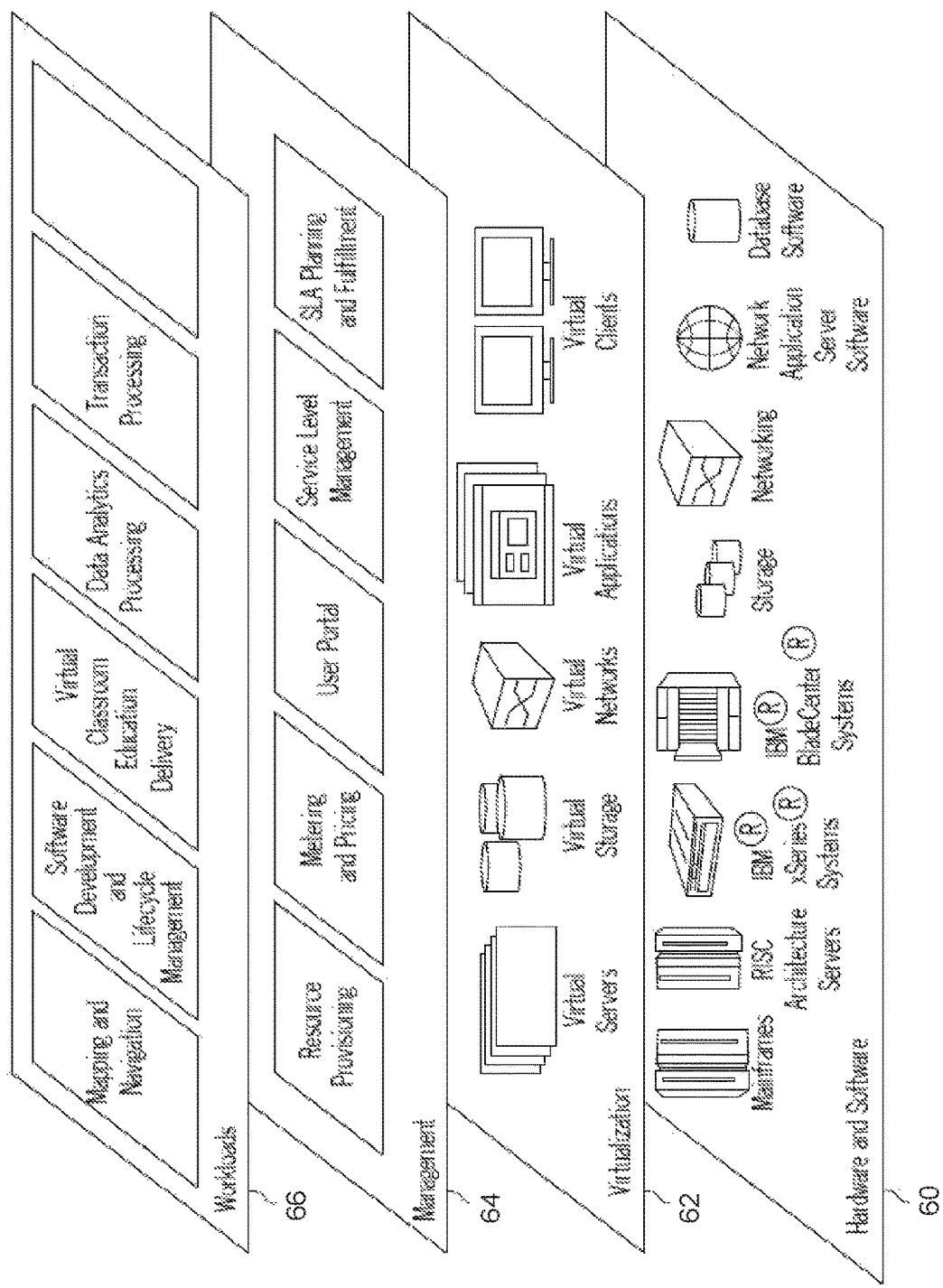
FIG. 6 illustrates abstraction model layers, according to one embodiment.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. The resource provisioning may be based on an analysis of the requested job/application and the cloud computing environment itself, as described above. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for sharing artifacts between instances of an application deployed in a cloud computing environment, the method comprising:

upon determining, during staging of the application, that a set of artifacts are not available for instances of the application to share in the cloud computing environment:

generating the set of artifacts via a first application instance by executing the first application instance for a predetermined period of time during a run phase of the staging of the application;

storing, via the first application instance, the set of artifacts in a computing system located in the cloud computing environment based on a hashed value of the application after the predetermined period of time has elapsed; and requesting a re-staging of the application via the first application instance;

during the re-staging of the application:
generating, via a second application instance, a file for deploying scaled instances of the application;
requesting, via the second application instance, the stored set of artifacts from the computing system located in the cloud computing environment during a compile phase of the re-staging;
verifying, via the second application instance, based on the hashed value of the application, that the stored set of artifacts belong to the application; and
packing the stored set of artifacts into the generated file via the second application instance after verifying that the stored set of artifacts belong to the application; and
executing an instance scale out of the application with the generated file comprising the stored set of artifacts.

2. The method of claim 1, wherein the determination that the set of artifacts are not available for instances of the application to share is based on either determining that the application has been pushed to the cloud computing environment for a first time, or determining that the application has been updated.

3. The method of claim 1, wherein the set of artifacts comprise at least one of shared class cache and pre-compiled code.

4. The method of claim 1, wherein the cloud computing environment comprises a Platform as a Service (PaaS) cloud platform.

5. A system, comprising:
a computer processor; and
a memory containing a program, which when executed by the processor, performs an operation for sharing artifacts between instances of an application deployed in a cloud computing environment, the operation comprising:
upon determining, during staging of the application, that a set of artifacts are not available for instances of the application to share in the cloud computing environment:
generating the set of artifacts via a first application instance by executing the first application instance for a predetermined period of time during a run phase of the staging of the application;
storing, via the first application instance, the set of artifacts in a computing system located in the cloud computing environment based on a hashed value of the application after the predetermined period of time has elapsed; and
requesting a re-staging of the application via the first application instance;
during the re-staging of the application:
generating, via a second application instance, a file for deploying scaled instances of the application;
requesting, via the second application instance, the stored set of artifacts from the computing system located in the cloud computing environment during a compile phase of the re-staging;
verifying, via the second application instance, based on the hashed value of the application, that the stored set of artifacts belong to the application; and
packing the stored set of artifacts into the generated file via a second application instance after verifying that the stored set of artifacts belong to the application; and
executing an instance scale out of the application with the generated file comprising the stored set of artifacts.

6. The system of claim 5, wherein the determination that the set of artifacts are not available for instances of the application to share is based on either determining that the application has been pushed to the cloud computing environment for a first time, or determining that the application has been updated.

7. The system of claim 5, wherein the set of artifacts comprise at least one of shared class cache and pre-compiled code.

8. The system of claim 5, wherein the cloud computing environment comprises a Platform as a Service (PaaS) cloud platform.

9. A computer program product, comprising:
a computer-readable storage medium having computer-readable program code embodied therewith, the computer-readable program code executable by one or more computer processors to perform an operation for sharing artifacts between instances of an application deployed in a cloud computing environment, the operation comprising:
upon determining, during staging of the application, that a set of artifacts are not available for instances of the application to share in the cloud computing environment:
generating the set of artifacts via a first application instance by executing the first application instance for a predetermined period of time during a run phase of the staging of the application;
storing, via the first application instance, the set of artifacts in a computing system located in the cloud computing environment based on a hashed value of the application after the predetermined period of time has elapsed; and
requesting a re-staging of the application via the first application instance;
during the re-staging of the application:
generating, via a second application instance, a file for deploying scaled instances of the application;
requesting, via the second application instance, the stored set of artifacts from the computing system located in the cloud computing environment during a compile phase of the re-staging;
verifying, via the second application instance, based on the hashed value of the application, that the stored set of artifacts belong to the application; and
packing the stored set of artifacts into the generated file via the second application instance after verifying that the stored set of artifacts belong to the application; and
executing an instance scale out of the application with the generated file comprising the stored set of artifacts.

10. The computer program product of claim 9, wherein the determination that the set of artifacts are not available for instances of the application to share is based on either determining that the application has been pushed to the cloud computing environment for a first time, or determining that the application has been updated.

11. The computer program product of claim 9, wherein the set of artifacts comprise at least one of shared class cache and pre-compiled code.

* * * * *